(12) United States Patent
Holmberg (10) Patent No.: US 9,963,331 B1
(45) Date of Patent: May 8, 2018

(54) SYSTEMS AND METHODS FOR OPERATING A POWERED PALLET JACK WITH STEERABLE FORKS

(71) Applicant: X Development LLC, Mountain View, CA (US)

(72) Inventor: Robert Andre Holmberg, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 168 days.

(21) Appl. No.: 14/849,648

(22) Filed: Sep. 10, 2015

(51) Int. Cl.
| | |
|---|---|
| *B66F 9/075* | (2006.01) |
| *B66F 9/06* | (2006.01) |
| *G05D 1/00* | (2006.01) |
| *G05D 1/02* | (2006.01) |
| *B62D 5/04* | (2006.01) |

(52) U.S. Cl.
CPC .......... *B66F 9/07568* (2013.01); *B62D 5/046* (2013.01); *B66F 9/063* (2013.01); *G05D 1/0088* (2013.01); *G05D 1/0212* (2013.01)

(58) Field of Classification Search
CPC ... B66F 9/063; B66F 9/07568; G05D 1/0212; G05D 1/0088; B62D 5/046
See application file for complete search history.

(56) References Cited

U.S. PATENT DOCUMENTS

| | | | | |
|---|---|---|---|---|
| 5,312,219 A | * | 5/1994 | Brown | B66F 9/105 180/6.48 |
| 5,680,099 A | * | 10/1997 | Springston | B60Q 1/52 340/461 |
| 6,260,646 B1 | | 7/2001 | Fernandez | |
| 7,744,335 B1 | | 6/2010 | Cleary | |
| 7,789,175 B2 | | 9/2010 | Tobey | |
| 8,075,244 B2 | | 12/2011 | Ellington | |
| 2004/0002794 A1 | * | 1/2004 | Pillar | A62C 27/00 701/1 |
| 2004/0073359 A1 | * | 4/2004 | Ichijo | B66F 9/0755 701/50 |
| 2004/0238257 A1 | * | 12/2004 | Takahashi | B62D 5/006 180/402 |
| 2010/0161179 A1 | * | 6/2010 | McClure | B63B 27/02 701/41 |
| 2014/0291594 A1 | | 10/2014 | Newell | |
| 2016/0002016 A1 | * | 1/2016 | McVicar | B62D 7/1509 254/2 R |

* cited by examiner

*Primary Examiner* — Jerrah Edwards
*Assistant Examiner* — Kelly D Williams
(74) *Attorney, Agent, or Firm* — McDonnell Boehnen Hulbert & Berghoff LLP (57) ABSTRACT

The present disclosure provides an example device including a frame. The frame includes a body, a first fork extending from the body, and a second fork extending from the body. The device also includes a first wheel coupled to the first fork of the frame, a second wheel coupled to the second fork of the frame, and a third wheel coupled to the body of the frame. The device also includes at least one steering motor to rotate the first wheel about a first steering axis and the second wheel about a second steering axis. The device also includes a second steering motor to rotate the third wheel about a third steering axis, and a traction motor to rotate the third wheel about a rolling axis. The device also includes a controller configured to operate the at least one steering motor, the second steering motor, and the traction motor to cause the device to navigate within an environment.

19 Claims, 6 Drawing Sheets

SYSTEMS AND METHODS FOR OPERATING A POWERED PALLET JACK WITH STEERABLE FORKS

BACKGROUND

A warehouse may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed to operate machines, vehicles, and other equipment. In some cases, one or more of the machines or vehicles may be robotic devices guided by computer control systems.

SUMMARY

When engaging a pallet, a pallet jack may be lined up in a well-planned manner such that the forks of the pallet jack are positioned under the pallet. Since the rollers in the forks of the pallet jack constrain side-to-side movement, last minute adjustments in typical pallet jacks require large steering maneuvers of the back end of the pallet jack, and could require a multi-step reversing zig-zag motion to be planned and executed. An example powered pallet jack with steerable forks may be more maneuverable to steer the forks into the target pallet, thus allowing more direct motion with greater ability to correct the path as the pallet jack approaches the target pallet. It would be difficult for a human driver to control three steering axes simultaneously, but an automated control system in communication with the steering motors of the pallet jack may enable such functionality. By making the wheels under the forks steerable but not drivable, the system avoids unnecessary hardware that would be difficult to fit within the limited space of the forks of the pallet jack.

In one example, a device is provided that includes a frame. The frame may also include a body, a first fork extending from the body, and a second fork extending from the body. The device may also include a first wheel coupled to the first fork of the frame, and a second wheel coupled to the second fork of the frame. The device may also include a third wheel coupled to the body of the frame. The device may also include at least one steering motor to rotate the first wheel about a first steering axis and the second wheel about a second steering axis. The device may also include a second steering motor to rotate the third wheel about a third steering axis, and a traction motor to rotate the third wheel about a rolling axis. The device may also include a controller configured to operate the at least one steering motor, the second steering motor, and the traction motor in order to cause the device to navigate within an environment.

In another example, a method is provided that includes determining, by a control system of a device, a target position of the device. The method may also include operating a first steering motor, a second steering motor, and a traction motor of the device to cause the device to navigate to the target position. The operating may comprise rotating, by the first steering motor of the device, a first wheel of the device about a first steering axis such that the first wheel has a first rolling axis. The operating may further comprise rotating, by the first steering motor of the device, a second wheel of the device about a second steering axis such that the second wheel has a second rolling axis. The operating may further comprise rotating, by the second steering motor of the device, a third wheel about a third steering axis such that the third wheel has a third rolling axis, wherein the first rolling axis, the second rolling axis, and the third rolling axis intersect at an instantaneous center of rotation of the device. The operating may further comprise rotating, by the traction motor of the device, the third wheel about the third rolling axis such that the third wheel propels the device along a surface to the target position.

In yet another example, a non-transitory computer readable medium is provided. The non-transitory computer readable medium may have instructions stored therein, that when executed by a device may cause the device to perform functions. The functions include determining a target position of the device. The functions may also include, in response to the determined target position of the device, operating a first steering motor, a second steering motor, and a traction motor of the device to cause the device to navigate to the target position. The operating may comprise rotating, by the first steering motor of the device, a first wheel of the device about a first steering axis such that the first wheel has a first rolling axis. The operating may further comprise rotating, by the first steering motor of the device, a second wheel of the device about a second steering axis such that the second wheel has a second rolling axis. The operating may further comprise rotating, by the second steering motor of the device, a third wheel about a third steering axis such that the third wheel has a third rolling axis, wherein the first rolling axis, the second rolling axis, and the third rolling axis intersect at an instantaneous center of rotation of the device. The operating may further comprise rotating, by the traction motor of the device, the third wheel about the third rolling axis such that the third wheel propels the device along a surface to the target position.

These as well as other aspects, advantages, and alternatives, will become apparent to those of ordinary skill in the art by reading the following detailed description, with reference where appropriate to the accompanying figures.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

An autonomous vehicle such as a pallet jack may be used to pick up, transport, and place objects, such as pallets of boxes, within an environment such as a warehouse. In some systems, the vehicle may be fully automated and operated by a control system located on the vehicle. In another example, the vehicle could have a human driver with automated assistance for select tasks. In other examples, different levels of remote assistance (e.g., from a remote human operator or a remote automated system) may be used to control or assist operation of the vehicle, ranging from direct remote control (referred to as "teleoperation") to select supervision of certain tasks or functions.

In one particular example, a powered pallet jack may be used to pick up, transport, and place a pallet of objects within a warehouse. Traditionally, a powered pallet jack is a three-wheeled vehicle. Such a pallet jack has a driven and steered wheel that may be controlled with human assistance. Further, such a pallet jack has two fixed-axle rollers in a set of forks that roll under a pallet in operation. When engaging such a pallet, the forks of the pallet jack must be lined up in a well-planned manner. Since the rollers in the forks of the pallet jack constrain side-to-side movement, last minute adjustments require large steering maneuvers of the back end of the pallet jack, and could require a multi-step reversing zig-zag motion to be planned and executed. Therefore, a powered pallet jack with steerable forks may be desirable.

A powered pallet jack with steerable forks would be more maneuverable to steer the forks into the target pallet, thus allowing more direct motion with greater ability to correct the path as the pallet jack approaches the target pallet. It would be difficult for a human driver to control three steering axes simultaneously, but an automated control system can do so to precisely to position the pallet jack. By making the wheels under the forks steerable but not drivable, the system avoids unnecessary hardware that would be difficult to fit under the forks of the pallet jack. The steering motors can be placed at the body of the pallet jack and connected to the wheels that are positioned in the forks.

In one example, a powered pallet jack includes an independently controlled steering axis on each fork roller in each fork of the pallet jack. In addition, the powered pallet jack includes a third wheel that is driven and steerable, which may be positioned under the body of the pallet jack. A computer system controls and coordinates the steering of all three wheels such that the mechanically extended rolling axes of all three wheels intersect at the instantaneous center of rotation of the powered pallet jack. The control system of the vehicle can compute the desired instantaneous center of rotation or the desired change in instantaneous center of rotation to achieve the navigation goal. Alternatively, the two fork rollers may be jointly steered using a single mechanism, instead of independent steering control of the two rollers. Such an embodiment may be advantageous for applications that involve the pallet jack spending the majority of the time driving with the fork-rollers locked in the nominal position, and only using fork steering during pallet docking maneuvers.

It should be understood that the above examples are provided for illustrative purposes, and should not be construed as limiting. As such, the implementations herein may additionally or alternatively includes other features or includes fewer features, without departing from the scope of the invention.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Example embodiments may involve a robotic fleet deployed within a warehouse environment. More specifically, a combination of fixed and mobile components may be deployed within the environment to facilitate automated processing of boxes, packages, or other types of objects. Example systems may involve automated loading and/or unloading of boxes and/or other objects, such as into storage containers or to and from delivery vehicles. In some example embodiments, boxes or objects may be automatically organized and placed onto pallets. Within examples, automating the process of loading/unloading trucks and/or the process of creating pallets from objects for easier storage within a warehouse and/or for transport to and from the warehouse may provide a number of industrial and business advantages.

According to various embodiments, automating the process of loading and/or unloading delivery trucks at the warehouse and/or the process of creating pallets may include the deployment of one or more different types of robotic devices to move objects or perform other functions. In some embodiments, some of the robotic devices can be made mobile by coupling with a wheeled base, a holonomic base (e.g., a base that can move in any direction), or rails on the ceiling, walls, or floors. In additional embodiments, some of the robotic devices may be made fixed within the environment as well. For instance, robotic manipulators can be positioned on elevated bases at different chosen locations within a warehouse.

As used herein, the term "warehouse" may refer to any physical environment in which boxes or objects may be manipulated, processed, and/or stored by robotic devices. In some examples, a warehouse may be a single physical building or structure, which may additionally contain certain fixed components, such as pallet racks for storing pallets of objects. In other examples, some fixed components may be installed or otherwise positioned within the environment before or during object processing. In additional examples, a warehouse may include multiple separate physical structures, and/or may also include physical spaces that are not covered by a physical structure as well.

Further, the term "boxes" may refer to any object or item that can be placed onto a pallet or loaded onto or unloaded from a truck or container. For example, in addition to rectangular solids, "boxes" can refer to cans, drums, tires or any other "simple" shaped geometric items. Additionally, "boxes" may refer to totes, bins, or other types of containers which may contain one or more items for transport or storage. For instance, plastic storage totes, fiberglass trays, or steel bins may be moved or otherwise manipulated by robots within a warehouse. Examples herein may also be applied toward objects other than boxes as well, and toward objects of various sizes and shapes. Additionally, "loading" and "unloading" can each be used to imply the other. For instance, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Within examples, a heterogeneous warehouse robot fleet may be used for a number of different applications. One possible application includes order fulfillment (e.g., for individual customers), in which cases may be opened and individual items from the cases may be put into packaging within boxes to fulfill individual orders. Another possible application includes distribution (e.g., to stores or other warehouses), in which mixed pallets may be constructed containing groups of different types of products to ship to stores. A further possible application includes cross-docking, which may involve transporting between shipping containers without storing anything (e.g., items may be moved from four 40-foot trailers and loaded into three lighter tractor trailers, and could also be palletized). Numerous other applications are also possible.

Figure 1A:
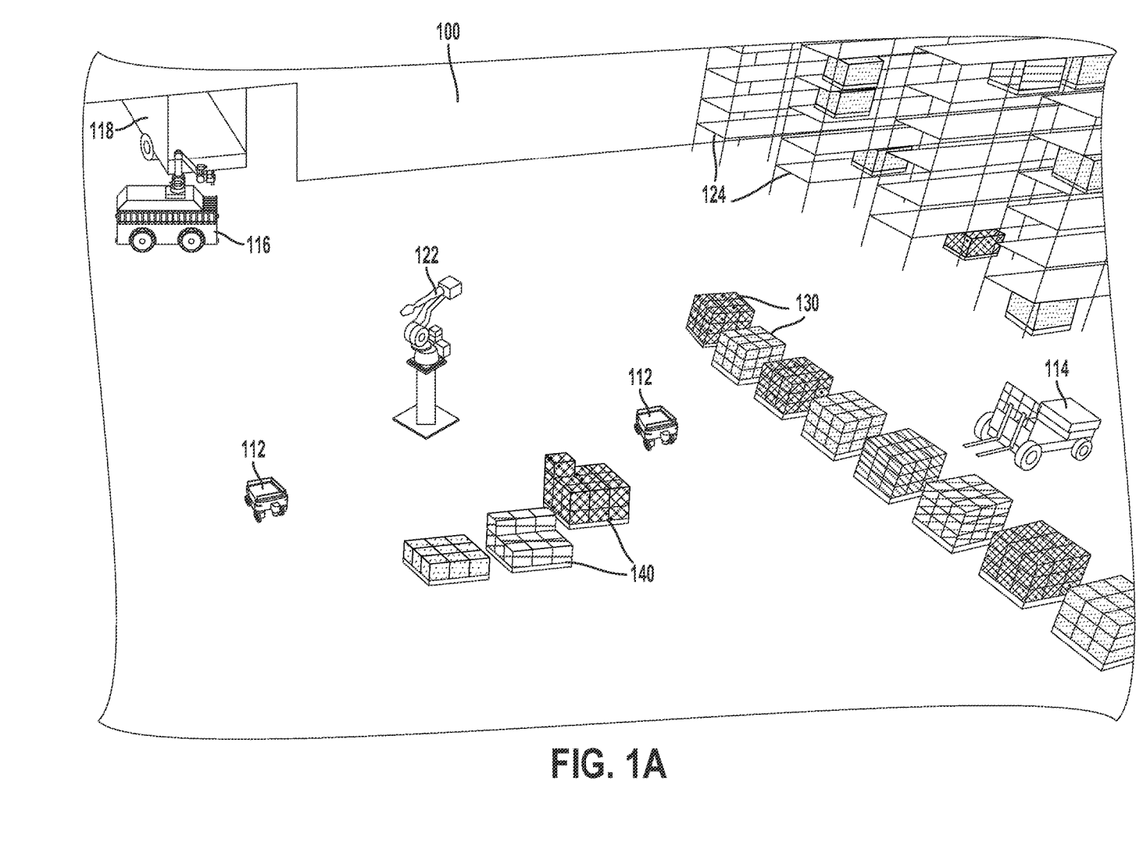
FIG. 1A shows a robotic fleet, according to an example embodiment.

Referring now to the figures, FIG. 1A depicts a robotic fleet within a warehouse setting, according to an example embodiment. More specifically, different types of robotic devices may form a heterogeneous robotic fleet 100 that may be controlled to collaborate to perform tasks related to the processing of items, objects, or boxes within a warehouse environment. Certain example types and numbers of different robotic devices are shown here for illustration purposes, but robotic fleet 100 may employ more or fewer robotic devices, may omit certain types shown here, and may also include other types of robotic devices not explicitly shown. Additionally, a warehouse environment is shown here with certain types of fixed components and structures, but other types, numbers, and placements of fixed components and structures may be used in other examples as well.

One example type of robotic device shown within robotic fleet 100 is an autonomous guided vehicle (AGV) 112, which may be a relatively small, mobile device with wheels that may function to transport individual packages, cases, or totes from one location to another within the warehouse. Another example type of robotic device is an autonomous fork truck 114, a mobile device with a forklift that may be used to transport pallets of boxes and/or to lift pallets of boxes (e.g., to place the pallets onto a rack for storage). An additional example type of robotic device is a robotic truck loader/unloader 116, a mobile device with a robotic manipulator as well as other components such as optical sensors to facilitate loading and/or unloading boxes onto and/or off of trucks or other vehicles. For instance, robotic truck unloader 116 may be used to load boxes onto delivery truck 118, which may be parked adjacent to the warehouse. In some examples, movements of delivery truck 118 (e.g., to deliver packages to another warehouse) may also be coordinated with robotic devices within the fleet.

Other types of mobile devices than those illustrated here may also be included as well or instead. In some examples, one or more robotic devices may use different modes of transportation besides wheels on the ground. For instance, one or more robotic devices may be airborne (e.g., quadcopters), and may be used for tasks such as moving objects or collecting sensor data of the environment.

In further examples, the robotic fleet 100 may also include various fixed components that may be positioned within the warehouse. In some examples, one or more fixed robotic devices may be used to move or otherwise process boxes. For instance, a pedestal robot 122 may include a robotic arm elevated on a pedestal that is fixed to the ground floor within the warehouse. The pedestal robot 122 may be controlled to distribute boxes between other robots and/or to stack and unstack pallets of boxes. For example, the pedestal robot 122 may pick up and move boxes from nearby pallets 140 and distribute the boxes to individual AGV's 112 for transportation to other locations within the warehouse.

In additional examples, robotic fleet 100 may employ additional fixed components positioned within a warehouse space. For instance, high density storage racks 124 may be used to store pallets and/or objects within the warehouse. The storage racks 124 may be designed and positioned to facilitate interaction with one or more robotic devices within the fleet, such as autonomous fork truck 114. In further examples, certain ground space may be selected and used for storage of pallets or boxes as well or instead. For instance, pallets 130 may be positioned within the warehouse environment at chosen locations for certain periods of time to allow the pallets to be picked up, distributed, or otherwise processed by one or more of the robotic devices.

Figure 1B:
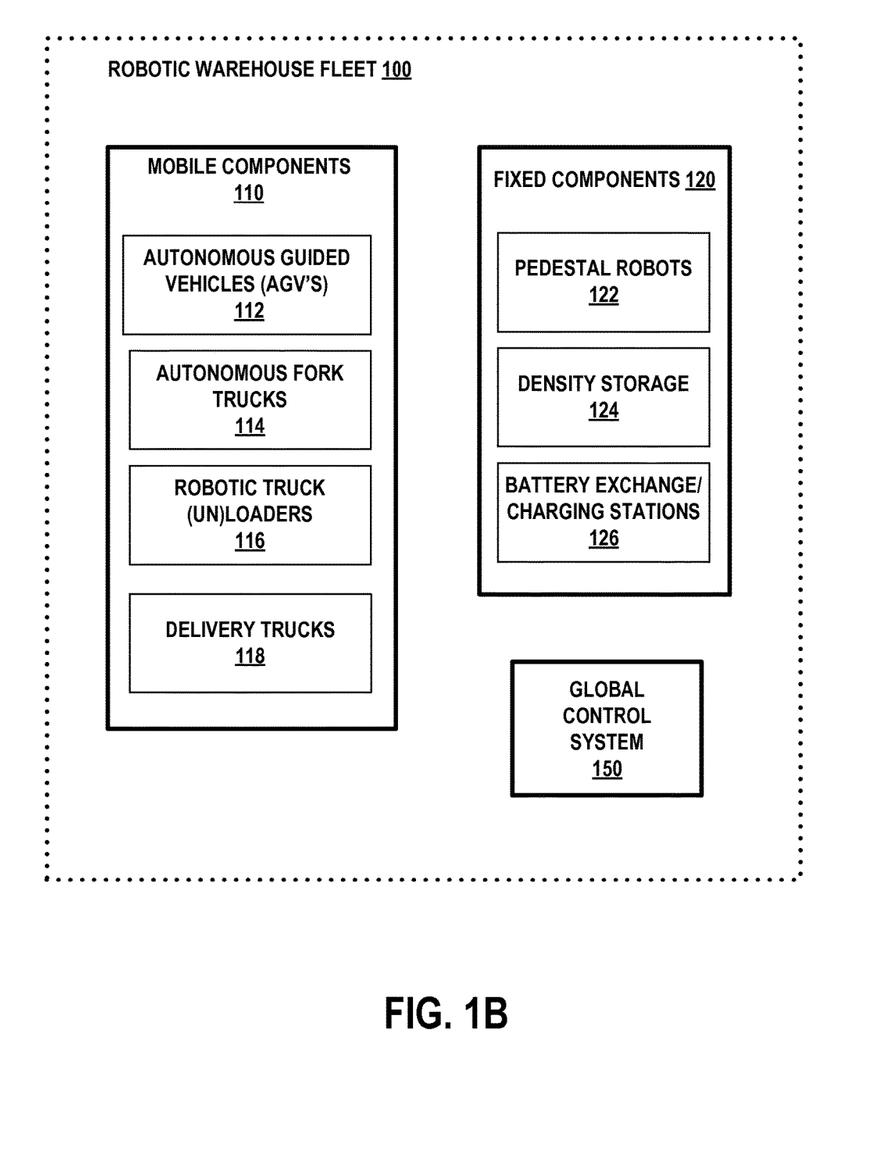
FIG. 1B is a functional block diagram illustrating components of a robotic fleet, according to an example embodiment.

FIG. 1B is a functional block diagram illustrating components of a robotic warehouse fleet 100, according to an example embodiment. The robotic fleet 100 could include one or more of various mobile components, such as AGV's 112, autonomous fork trucks 114, robotic truck loaders/unloaders 116, and delivery trucks 118. The robotic fleet 100 may additionally include one or more fixed components positioned within a warehouse or other environment, such as pedestal robots 122, density storage containers 124, and battery exchange/charging stations 126. In further examples, different numbers and types of the components illustrated within FIG. 1B may be included within a fleet, certain types may be omitted, and additional functional and/or physical components may be added to the examples illustrated by FIGS. 1A and 1B as well. To coordinate actions of separate components, a global control system 150, such as a remote, cloud-based server system, may communicate (e.g., through wireless communication) with some or all of the system components and/or with separate local control systems of individual components.

Within examples, certain of the fixed components 120 may be installed before deployment of the rest of the robotic fleet 100. In some examples, one or more mobile robots may be brought in to map a space before determining placement of certain fixed components 120, such as the pedestal robots 122 or battery exchange stations 126. Once map information is available, the system may determine (e.g., by running simulations) how to layout the fixed components within the space available. In certain cases, a layout may be chosen to minimize the number of fixed components needed and/or the amount of space used by those components. The fixed components 120 and mobile components 110 may be deployed in separate stages or all at once. In additional examples, certain of the mobile components 110 may only be brought in during particular time periods or to complete particular tasks.

In some examples, global control system 150 may include a central planning system that assigns tasks to different robotic devices within fleet 100. The central planning system may employ various scheduling algorithms to determine which devices will complete which tasks at which times. For instance, an auction type system may be used in which individual robots bid on different tasks, and the central planning system may assign tasks to robots to minimize overall costs. In additional examples, the central planning system may optimize across one or more different resources, such as time, space, or energy utilization. In further examples, a planning or scheduling system may also incorporate particular aspects of the geometry and physics of box picking, packing, or storing.

Planning control may also be distributed across individual system components. For example, global control system 150 may issue instructions according to a global system plan, and individual system components may also operate according to separate local plans. Additionally, different levels of detail may be included within a global plan, with other aspects left for individual robotic devices to plan locally. For instance, mobile robotic devices may be assigned target destinations by a global planner but the full routes to reach those target destinations may be planned or modified locally.

In additional examples, a central planning system may be used in conjunction with local vision on individual robotic devices to coordinate functions of robots within robotic fleet 100. For instance, a central planning system may be used to get robots relatively close to where they need to go. However, it may be difficult for the central planning system to command robots with millimeter precision, unless the robots are bolted to rails or other measured components are used to precisely control robot positions. Local vision and planning for individual robotic devices may therefore be used to allow for elasticity between different robotic devices. A general planner may be used to get a robot close to a target location, at which point local vision of the robot may take over. In some examples, most robotic functions may be position-controlled to get the robots relatively close to target locations, and then vision and handshakes may be used when needed for local control.

In further examples, visual handshakes may enable two robots to identify one another by AR tag or other characteristics, and to perform collaborative operations within fleet 100. In additional examples, items (e.g., packages to be shipped) may be provided with visual tags as well or instead, which may be used by robotic devices to perform operations on the items using local vision control. In particular, the tags may be used to facilitate manipulation of the items by the robotic devices. For instance, one or more tags on particular locations on a pallet may be used to inform a fork lift where or how to lift up the pallet.

In additional examples, deployment and/or planning strategies for fixed and/or mobile components may be optimized over time. For instance, a cloud-based server system may incorporate data and information from individual robots within the fleet and/or from external sources. Strategies may then be refined over time to enable the fleet to use less space, less time, less power, less electricity, or to optimize across other variables. In some examples, optimizations may span across multiple warehouses, possibly including other warehouses with robotic fleets and/or traditional warehouses. For instance, global control system 150 may incorporate information about delivery vehicles and transit times between facilities into central planning.

In some examples, a central planning system may sometimes fail, such as when a robot gets stuck or when packages get dropped in a location and lost. Local robot vision may also therefore provide robustness by inserting redundancy to handle cases where the central planner fails. For instance, as an automatic pallet jack passes and identifies an object, the pallet jack may send information up to a remote, cloud-based server system. Such information may be used to fix errors in central planning, help to localize robotic devices, or to identify lost objects.

In further examples, a central planning system may dynamically update a map of the physical environment containing robotic fleet 100 and objects undergoing processing by the robotic devices. In some examples, the map may be continuously updated with information about dynamic objects (e.g., moving robots and packages moved by robots). In additional examples, a dynamic map could contain information on both the current configuration or placement of components within a warehouse (or across multiple warehouses) as well as information about what is anticipated in the near term. For instance, the map could show current locations of moving robots and anticipated locations of the robots in the future, which may be used to coordinate activity between robots. The map could also show current locations of items undergoing processing as well as anticipated future locations of the items (e.g., where an item is now and when the item is anticipated to be shipped out).

In additional examples, some or all of the robots may scan for labels on objects at different points within the process. The scans may be used to look for visual tags that may be applied to individual components or specific items to facilitate finding or keeping track of components and items. This scanning may yield a trail of items constantly moving around as the items are manipulated or transported by robots. A potential benefit is added transparency, both on the supplier side and the consumer side. On the supplier side, information about current locations of inventory may be used to avoid overstocking and/or to move items or pallets of items to different locations or warehouses to anticipate demand. On the consumer side, the information about current locations of particular items may be used to determine when a particular package will be delivered with improved accuracy.

In some examples, some or all of the mobile components 110 within robotic fleet 100 may periodically receive charged batteries from a battery exchange station 126 equipped with multiple battery chargers. In particular, the station 126 may replace a mobile robot's old batteries with recharged batteries, which may prevent robots from having to sit and wait for batteries to charge. The battery exchange station 126 may be equipped with a robotic manipulator such as a robotic arm. The robotic manipulator may remove batteries from an individual mobile robot and attach the batteries to available battery chargers. The robotic manipulator may then move charged batteries located at the station 126 into the mobile robot to replace the removed batteries. For instance, an AGV 112 with a weak battery may be controlled to move over to battery exchange station 126 where a robotic arm pulls a battery out from the AGV 112, puts the battery in a charger, and gives the AGV 112 a fresh battery.

In further examples, battery exchanges may be scheduled by a central planning system. For instance, individual mobile robots may be configured to monitor their battery charge status. The robots may periodically send information to the central planning system indicating the status of their batteries. This information may then be used by the central planning system to schedule battery replacements for individual robots within the fleet when needed or convenient.

In some examples, a fleet 100 may contain a number of different types of mobile components 110 that use different types of batteries. A battery exchange station 126 may therefore be equipped with different types of battery chargers for different types of batteries and/or mobile robots. The battery exchange station 126 may also be equipped with a robotic manipulator that can replace batteries for different types of robots. In some examples, mobile robots may have battery containers containing multiple batteries. For instance, an autonomous fork truck 114 such as a pallet jack may have a steel bucket with 3 or 4 batteries. The robotic arm at the station 126 may be configured to lift out the entire bucket of batteries and attach individual batteries to battery chargers on a shelf at the station 126. The robotic arm may then find charged batteries to replace the old batteries, and move those batteries back into the bucket before reinserting the bucket into the pallet jack.

In further examples, global control system 150 and/or a separate control system of the battery exchange station 126 may also automate battery management strategies. For instance, each battery may have a barcode or other identifying mark so that the system can identify individual batteries. A control system of the battery exchange station 126 may count how many times individual batteries have been recharged (e.g., to determine when to change water or empty batteries completely). The control system may also keep track of which batteries have spent time in which robotic devices, how long the batteries took to recharge at the station 126 in the past, and other relevant properties for efficient battery management. This battery usage information may be used by the control system to select batteries for the robotic manipulator to give to particular mobile robots.

In additional examples, a battery exchange station 126 may also involve a human operator in some cases. For instance, the station 126 could include a rig where people can safely perform manual battery changing or deliver new batteries to the station for deployment into the fleet 100 when necessary.

Figure 2:
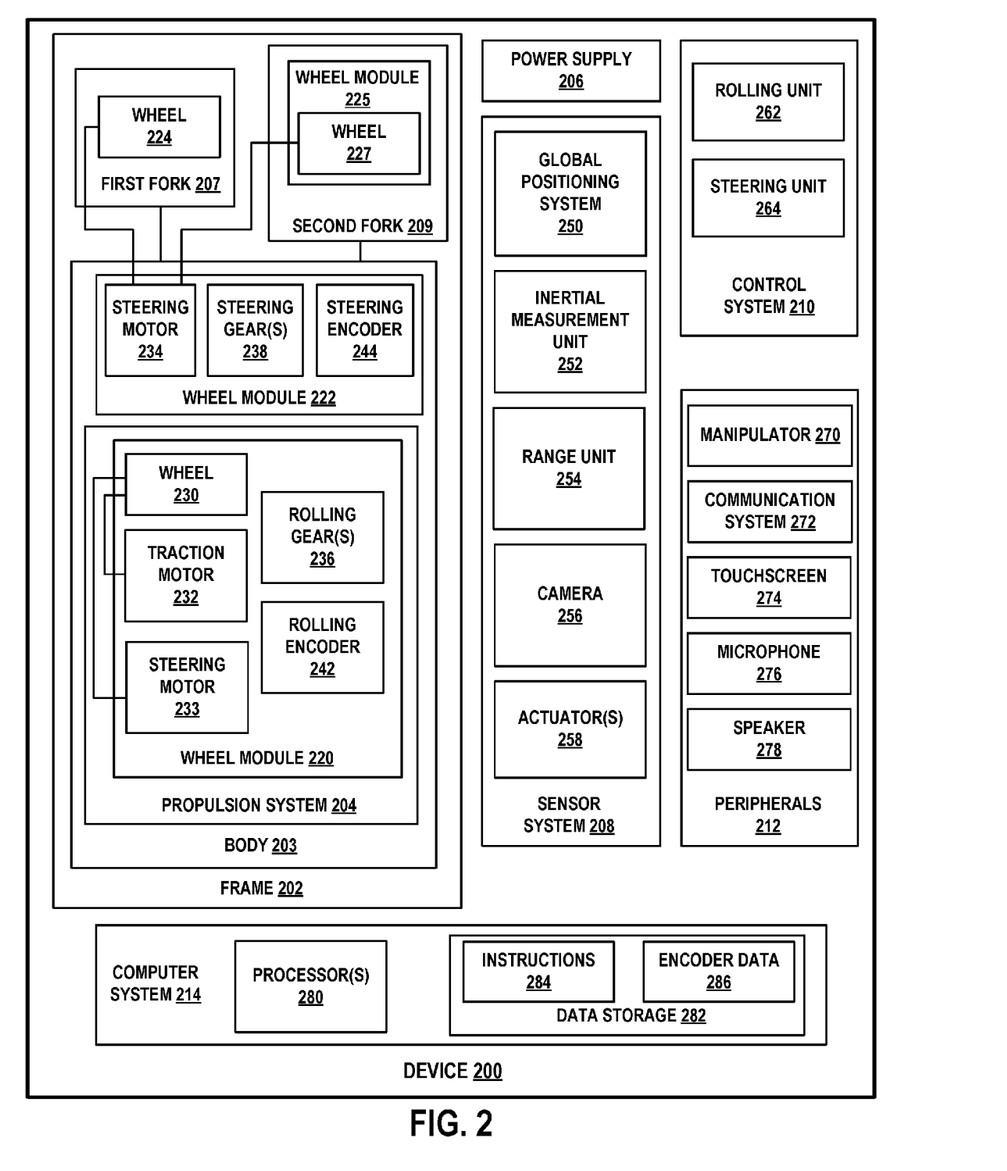
FIG. 2 is a simplified block diagram of a device, according to an example embodiment.

FIG. 2 is a simplified block diagram of a device 200 that may be included within a robotic warehouse fleet. Other devices which vary in form from those illustrated here as well as other types of devices may also be included. As shown, the device 200 includes a frame 202, a propulsion system 204, a steering system 205, a power supply 206, a sensor system 208, a control system 210, peripherals 212, and a computer system 214. In other embodiments, the device 200 may include more, fewer, or different systems, and each system may include more, fewer, or different components. Additionally, the systems and components shown may be combined or divided in any number of ways.

The frame 202 may be configured to support the various components of the device 200. For example, the frame 202 may include aluminum, titanium, other metal/metal-alloy, plastic, composite, wood, or any other solid material having shape and material characteristics to support the components of the device 200. As shown in FIG. 2, the frame 202 may include a body 203, a first fork 207 extending from the body 203, and a second fork 209 extending from the body 203.

The propulsion system 204 may be configured to provide powered motion for the device 200. As illustrated in FIG. 2, the propulsion system 204 includes wheel module 220. The wheel module 220 includes a wheel 230, a traction motor 232, a steering motor 233, one or more rolling gears 236, and a rolling encoder 242.

The wheel 230 may include any type of wheel, such as a single wheel, double wheel, compound wheel, castor wheel, or any other wheel configured to rotate to move the device 200 along a heading (e.g., steering direction) of the wheel 230. The wheel 230 may include one or more solid materials suitable for performing the function of the wheel 230 such as plastic, composite, metal, metal compound, etc. By way of example, a castor wheel may be configured to roll along a straight line path, or mounted on a pivot (e.g., swivel, etc.) such that the wheel 230 may align with a direction of travel. Additionally, in some examples, the wheel 230 may include an energy-absorbing material (e.g., rubber, etc.) to facilitate operation and/or maintenance of the wheel 230. For example, the wheel 230 may include a tire coupled to a rim of the wheel 230. The wheel 230 may be coupled to the body 203 of the frame 202.

The traction motor 232 may be configured to rotate the wheel 230 about a rolling axis of the wheel 230. Thus, for example, the traction motor 232 may cause the wheel 230 to move forward or backward. Wheel module 220 may further include steering motor 233, which may be configured to rotate the wheel 230 about a steering axis of the wheel 230. Thus, for example, the steering motor 233 may adjust a steering angle or direction of the wheel 230. The traction motor 232 and/or steering motor 233 may include any combination of motors such as an electric motor, a steam motor, a sterling motor, a combustion motor, or any other motor. In some examples, the traction motor 232 and/or steering motor 233 may include multiple types of motors. For example, a gas-electric hybrid device may include a gasoline engine and an electric engine that are intermittently activated as the fraction motor 232 and/or steering motor 233. Other examples are possible as well.

The rolling gear(s) 236 may be configured to couple the traction motor 232 with the wheel 230. Further, the rolling gear 236 may be configured to provide a rolling gear ratio that corresponds, for example, to a number of rotations of the traction motor 232 to a single rotation of the wheel 230 about the rolling axis of the wheel 230. Alternatively, the rolling gear ratio provided by the rolling gear 236 may correspond, for example, to a number of rotations of the wheel 230 about the rolling axis to a single rotation of the traction motor 232. Thus, for example, the rolling gear 236 may allow transmitting a torque of the traction motor 232 to the wheel 230. In some examples, the rolling gear 236 may be configured as a rotating machine part (e.g., cogwheel, etc.) having cut teeth, or cogs, which mesh with another toothed machine part having a different/same number of teeth to provide the rolling gear ratio. Additionally, in some examples, the rolling gear 236 may include more than one gear arranged as a transmission system to change speed, torque, and direction of rotation of the wheel 230 about the rolling axis relative to the traction motor 232. Additionally, in some examples, the rolling gear 236 may include other transmission components such as clutches, differentials, pulleys, belts, drive shafts, and/or other elements. For example, the rolling gear 236 may include one or more axles to couple the fraction motor 232 with the wheel 230.

The rolling encoder 242 may be coupled to the traction motor 232 and configured to provide data indicative of motion of the traction motor 232. As used herein, the term "encoder" means any sensor or device used to detect angular position. For example, the rolling encoder 242 may include a rotary encoder, a shaft encoder, a potentiometer, or any other electro-mechanical device configured to convert an angular position/motion of a shaft of the traction motor 232 to an analog or digital signal (e.g., the data, etc.). Various implementations are possible for the rolling encoder 242 and/or the steering encoder 244 such as mechanical (e.g., metal disc containing a set of concentric rings of openings), optical (e.g., glass/plastic with transparent and opaque areas), magnetic (e.g., disc that includes a series of magnetic poles), capacitive (e.g., asymmetrical shaped disc rotated within the encoder to adjust capacitance between two electrodes), or any other implementation.

The device 200 may further include a steering system 205. As illustrated in FIG. 2, the steering system 205 includes wheel modules 222 and 225. The wheel module 222 includes a wheel 224, a steering motor 234, one or more steering gears 238, and a steering encoder 244. The wheel 224 may be coupled to the first fork 207 of the frame 202. The steering motor 234 may be configured to rotate the wheel 224 about a steering axis of the wheel 224. Thus, for example, the steering motor 234 may adjust a steering angle or direction of the wheel 224. The steering motor 234 may include any combination of motors such as an electric motor, a steam motor, a sterling motor, a combustion motor, or any other motor. In some examples, the steering motor 234 may include multiple types of motors. For example, a gas-electric hybrid device may include a gasoline engine and an electric engine that are intermittently activated as the steering motor 234. Other examples are possible as well.

The steering gear(s) 238 may be configured to couple the steering motor 234 with the wheel 230. Further, the steering gear 238 may be configured to provide a steering gear ratio that corresponds, for example, to a number of rotations of the steering motor 234 to a single rotation of the wheel 224 about the steering axis of the wheel 224. Alternatively, the steering gear ratio provided by the steering gear 238 may correspond, for example, to a number of rotations of the wheel 224 about the steering axis to a single rotation of the steering motor 234. Thus, for example, the steering gear 238 may allow transmitting a torque of the steering motor 234 to the wheel 224. In some examples, the steering gear 238 may be configured as a rotating machine part (e.g., cogwheel, etc.) having cut teeth, or cogs, which mesh with another toothed machine part having a different/same number of teeth to provide the steering gear ratio. Additionally, in some examples, the steering gear 238 may include more than one gear arranged as a transmission system to change speed, torque, and direction of rotation of the wheel 224 about the steering axis relative to the steering motor 234. Additionally, in some examples, the steering gear 238 may include other transmission components such as clutches, differentials, pulleys, drive shafts, belts, and/or other elements. Further, the steering encoder 244 may be coupled to the steering motor 234 and configured to provide data indicative of orientation of the steering motor 234.

Wheel module 225 may be configured similarly to the wheel module 222, and/or may include components similar to components of the wheel module 222. In particular, wheel module 225 may include wheel 227 coupled to the second fork 209 of the frame 202.

Accordingly, the device 200 may include a plurality of wheels such as the wheel 230 of the wheel module 220, and corresponding wheels of the wheel modules 222 and 225. In one example, the device 200 includes steering motor 234 coupled to wheel 224, and another steering motor (not shown) coupled to wheel 227 of wheel module 225. In such an example, each steering motor comprises an electric motor with a worm-drive gearbox configured to turn a slew bearing positioned around a given wheel. In another example, each steering motor comprises an electric motor positioned in the body 203 of the frame 202, and a chain-drive positioned in a given fork configured to turn a sprocket mounted on a slew bearing positioned around a given wheel. In yet another example, each steering motor comprises a direct drive motor driving a moving portion of the slew bearing positioned around a given wheel. In such an example, the direct drive motor has a stator attached to the frame 202 and a rotor attached to the inner face of the slew bearing that thereby provides the steering axis of the given wheel. In still another example, the device 200 includes a single steering motor 234 operable to steer both wheel 224 and wheel 227. Other configurations are possible as well.

The plurality of wheels may be coupled to the frame 202 in a given arrangement. For example, the plurality of wheels may be arranged symmetrically, asymmetrically, or in any other arrangement according to a particular configuration of the device 200. Although FIG. 2 shows that the device 200 includes three wheel modules, in other embodiments, device 200 may include a different number of wheel modules. For example, the device 200 may include two, four, five, or more wheel modules.

In some examples, the data provided by the rolling encoder 242 and/or the steering encoder 244 may indicate a change in a position (e.g., orientation) of, respectively, the traction motor 232 and/or the steering motor 234. Further, for example, the rolling encoder 242 and/or the steering encoder 244 may provide a signal (e.g., index pulse, etc.) indicative of the traction motor 232 and/or the steering motor 234 being at a particular orientation. Further, in some examples, the data provided by the rolling encoder 242 and/or the steering encoder 244 may be processed by the device 200 to determine speeds of the traction motor 232 and/or the steering motor 234. For example, a time measurement may be obtained by the device 200 in addition to the data from the rolling encoder 242 and/or the steering encoder 244 to determine the speeds of the traction motor 232 and/or the steering motor 234.

Accordingly, in some examples, the rolling encoder 242 and/or the steering encoder 244 may include an incremental encoder configured to provide the data indicative of a change in the orientation of the traction motor 232 and/or the steering motor 234. In these examples, the device 200 may cause the traction motor 232 and/or the steering motor 234 to rotate the wheel 230, respectively, about the rolling axis and/or steering axis of the wheel 230 until the signal (e.g., index pulse, etc.) of the rolling encoder 242 and/or the steering encoder 244 is detected to determine the particular orientations of the traction motor 232 and/or the steering motor 234.

Additionally or alternatively, in some examples, the rolling encoder 242 and/or the steering encoder 244 may include an absolute encoder configured to provide the data. The absolute encoder, for example, may be configured to detect motion/change in orientations of the traction motor 232 and/or the steering motor 234 even if the absolute encoder is not provided with power. In these examples, the rolling encoder 242 and/or the steering encoder 244 may provide the data indicative of the orientations of the traction motor 232 and/or the steering motor 234 without the device 200 rotating a given wheel until the signal (e.g., index pulse) is received from the rolling encoder 242 and/or the steering encoder 244. Moreover, in some examples, the device 200 may be configured to determine a rolling speed and/or a steering speed of a given based on the data provided by the rolling encoder 242 and/or the steering encoder 244 and the gear ratios (e.g., the rolling gear ratio, the steering gear ratio, etc.) provided by the gears 236, 238.

Accordingly, in some examples, the propulsion system 204 and steering system 205 may change a position of the device 200 based on control of the wheel modules 220, 222, 225. For example, the data provided by the plurality of encoders may be conditioned as inputs to a control loop (e.g., the control system 210) and outputs of the control loop may be conditioned as inputs to the plurality of motors to cause the motion of the device 200.

The power supply 206 may be configured to provide power to some or all of the components of the device 200. To this end, the power supply 206 may include, for example, a rechargeable lithium-ion or lead-acid battery. In some embodiments, one or more banks of batteries may be configured to provide electrical power. Other power supply materials and configurations are possible as well, such as non-rechargeable batteries, etc. For example, the power supply 206 may include a source of energy that powers some or all the components of the device 200. Example sources of energy may include gasoline, diesel, propane, other compressed gas-based fuels, ethanol, solar panels, batteries, or any other sources of energy. Further, for example, the power supply 206 may include wired (e.g., power cable, usb cable, etc.) and/or wireless connectivity (e.g., energy-harvesting antenna, etc.) with an external source (e.g., wall outlet, other power outlet, radiating antenna, etc.) to receive the energy and provide the power to the various components of the device 200. Additionally or alternatively, the power supply 206 may include a combination of fuel tanks, batteries, capacitors, flywheels, etc.

The sensor system 208 may include a number of sensors configured to sense information about an environment in which the device 200 is located, as well as one or more actuators 258 configured to modify a position and/or orientation of the sensors. As shown, the sensors of the sensor system 208 include a Global Positioning System (GPS) 250, an inertial measurement unit (IMU) 252, a range unit 254, and a camera 256. The sensor system 208 may include additional sensors as well, including, for example, sensors that monitor internal systems of the device 200 (e.g., an $O_2$ monitor, a fuel gauge, a temperature monitor, etc.). Other sensors are possible as well.

The GPS 250 may be any sensor configured to estimate a geographic location of the device 200. To this end, the GPS 250 may include a transceiver configured to estimate a position of the device 200 with respect to the Earth. The GPS 250 may take other forms as well.

The IMU 252 may be any combination of sensors configured to sense position and orientation changes of the device 200 based on inertial acceleration. In some embodiments, the combination of sensors may include, for example, accelerometers and gyroscopes. Other combinations of sensors are possible as well.

The range unit 254 may be any sensor configured to sense objects in the environment in which the device 200 is located such as a RADAR (e.g., using radio signals), a LIDAR (e.g., using lasers), an Infrared range unit (e.g., using infrared), or any other range sensor. For example, the range unit 254 may include a light source and/or a light detector configured to emit light and detect reflections of the light. Further, in some examples, the range unit 254 may be configured to operate in a coherent (e.g., using heterodyne detection) or an incoherent detection mode. In some embodiments, in addition to sensing the objects, the range unit 254 may additionally be configured to sense the speed and/or heading of the objects.

The camera 256 may include any camera (e.g., a still camera, a video camera, etc.) configured to capture images of the environment in which the device 200 is located. To this end, the camera may take any of the forms described above or may take any other form. The sensor system 208 may additionally or alternatively include components other than those shown in FIG. 2.

The control system 210 may be configured to control operation of the device 200 and/or components thereof. To this end, the control system 210 may include a rolling unit 262 and a steering unit 264.

The rolling unit 262 may include any combination of mechanisms configured to adjust rolling motion of wheels (e.g., wheel 230, etc.) in the propulsion system 204. For example, the control system 210 may receive instructions to traverse the device 200 at a particular speed, and the control system 210 may control the fraction motor 232 to cause the wheel 230 to roll at the particular speed. In some examples, the rolling unit 262 may be implemented as a control loop that receives inputs from the rolling encoders (e.g., the rolling encoder 242) and provides output signals to control power provided to the traction motors (e.g., the traction motor 232) to achieve the particular speed of the wheels (e.g., the wheel 230). Example control loops may include open loops, closed loops, etc. For example, the rolling unit 262 may be implemented as proportional-integral-derivative (PID) controller. Other examples are possible as well.

The steering unit 264 may include any combination of mechanisms configured to adjust steering motion of wheels (e.g., wheel 224, etc.) in the steering system 205. Similarly to the rolling unit 262, for example, the steering unit 264 may be implemented as a control loop that receives inputs from steering encoder 244 and provides outputs to control power to the steering motor 234 to achieve a desired change in the steering angle of the wheel 224 at a particular speed. The control system 210 may additionally or alternatively include components other than those shown in FIG. 2.

Peripherals 212 may be configured to allow the device 200 to interact with external sensors, other devices, objects in the environment of the device 200, and/or a user, etc. To this end, the peripherals 212 may include, for example, a manipulator 270, a communication system 272, a touchscreen 274, a microphone 276, and/or a speaker 278.

The manipulator 270, for example, may include any manipulator such as a robotic arm, etc., configured to manipulate objects in the environment of the device 200. For example, the manipulator 270 may receive control signals to interact with objects in the environment of the device 200.

The communication system 272 may include a wired communication interface (e.g., parallel port, USB, etc.) and/or a wireless communication interface (e.g., antennae, transceivers, etc.) to receive and/or provide signals from/to external devices. In some examples, the communication system 272 may receive instructions for operation of the device 100. Additionally or alternatively, in some examples, the communication system 272 may provide output data such as data from the encoders 242, 244 and/or data from the sensor system 208.

The touchscreen 274 may be used by a user to input commands to the device 200. To this end, the touchscreen 274 may be configured to sense at least one of a position and a movement of a user's finger via capacitive sensing, resistance sensing, or a surface acoustic wave process, among other possibilities. The touchscreen 274 may be capable of sensing finger movement in a direction parallel or planar to the touchscreen surface, in a direction normal to the touchscreen surface, or both, and may also be capable of sensing a level of pressure applied to the touchscreen surface. The touchscreen 274 may be formed of one or more translucent or transparent insulating layers and one or more translucent or transparent conducting layers. The touchscreen 274 may take other forms as well. Further, in some examples, the touchscreen 274 may be configured as a display for providing output from various components of the device 200, such as the sensor system 208.

The microphone 276 may be configured to receive audio (e.g., a voice command or other audio input) from a user of the device 200. Similarly, the speakers 278 may be configured to output audio to the user of the device 200. The peripherals 212 may additionally or alternatively include components other than those shown in FIG. 2.

The computer system 214 includes one or more processors 280 and data storage 282. In some examples, some components of the computer system 214 may be distributed across multiple computing devices. For example, the data storage 282 may be included in an external data storage device communicatively linked with the device 200. Other examples are possible as well. However, for the sake of example, the components are shown and described as part of the computer system 214.

The computer system 214 may be configured to transmit data to and receive data from one or more of the propulsion system 204, the sensor system 208, the control system 210, and/or the peripherals 212. To this end, the computer system 214 may be communicatively linked to one or more of the propulsion system 204, the sensor system 208, the control system 210, and/or the peripherals 212 by a system bus, network, and/or other connection mechanism (not shown in FIG. 2).

The computer system 214 may be further configured to interact with and control one or more components of the propulsion system 204, the steering system 205, the sensor system 208, the control system 210, and/or the peripherals 212. For example, the computer system 214 may be configured to provide instructions to the steering unit 264 to cause the steering motor 234 to adjust the steering angle (e.g., orientation, etc.) of the wheel 224. As another example, the computer system 214 may be configured to cause the camera 256 to capture images of the environment of the device 200. As yet another example, the computer system 214 may be configured to store and execute instructions for displaying visual information on the touchscreen 274. Other examples are possible as well.

The processor(s) 280 may comprise one or more general-purpose processors and/or one or more special-purpose processors. To the extent the processor 280 includes more than one processor, such processors may work separately or in combination. For example, a first processor of the processor(s) 280 may operate the propulsion system 204, and a second processor of the processor(s) 280 may operate the sensor system 208, etc. The data storage 282, in turn, may comprise one or more volatile and/or one or more non-volatile storage components, such as optical, magnetic, and/or organic storage, and the data storage 282 may be integrated in whole or in part with the processor 280.

In some embodiments, the data storage 282 may contain instructions 284 (e.g., program logic) executable by the processor 280 to perform various functions of the device 200. The data storage 282 may contain additional instructions as well, including instructions to transmit data to, receive data from, interact with, and/or control one or more of the propulsion system 204, the steering system 205, the sensor system 208, the control system 210, the peripherals 212, and/or any other component of the device 200. Further, the data storage 282 may also store collected encoder data 286 that may include data provided by the plurality of encoders in the propulsion system 204 and steering system 205 (e.g., rolling encoder 242, steering encoder 244, etc.). Therefore, in some examples, the processor 280 may execute the instructions 284 to analyze the stored encoder data 286 and determine information pertaining to the propulsion system 204 and/or the steering system 205. For example, the computer system 214 may determine possible orientations of the plurality of wheels (e.g., wheel 230, etc.) based on the stored encoder data 286 and the given arrangement of the plurality of wheels. Other examples are possible as well and are described in greater detail in exemplary embodiments of the present disclosure. Although not illustrated in FIG. 2, the data storage 282 may store other data such as data collected by the sensor system 208, and/or data from the control system 210, etc. The computer system 214 may additionally or alternatively include components other than those shown in FIG. 2.

In some embodiments, one or more of the propulsion system 204, the steering system 205, the sensor system 208, the control system 210, and the peripherals 212 may be configured to work in an interconnected fashion with other components within and/or outside their respective systems. Further, the device 200 may include one or more elements in addition to or instead of those shown. For example, the device 200 may include one or more additional interfaces and/or power supplies. Other additional components are possible as well. In such embodiments, the data storage 282 may further include instructions (e.g., instructions 284, etc.) executable by the processor 280 to control and/or communicate with the additional components.

Still further, while each of the components and systems are shown to be integrated in the device 200, in some embodiments, one or more components or systems may be removably mounted to or otherwise connected (e.g., mechanically or electrically) to the device 200 using wired or wireless connections. The device 200 may take other forms as well.

Figure 3:
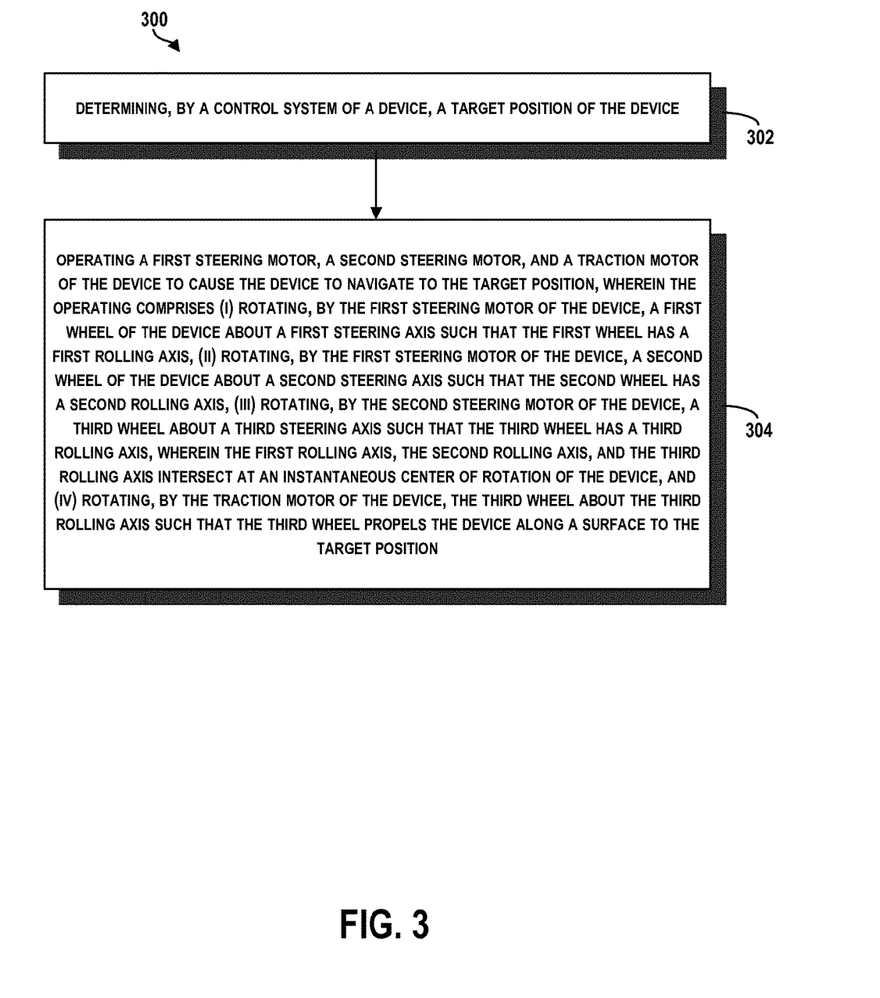
FIG. 3 is a block diagram of a method, according to an example embodiment.

FIG. 3 is a block diagram of a method 600, according to an example embodiment. Method 300 shown in FIG. 3 presents an embodiment of a method that could be used with the device 200, for example. Method 300 may include one or more operations, functions, or actions as illustrated by one or more of blocks 302-304. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes determining, by a control system of a device, a target position of the device. In one example, the target position may coincide with an object in an environment of the device. Within examples, an example device is a mechanically operable mobile device with at least some functions automated by a control system of the device. Additionally, the device may include one or more lift elements, which are actuatable components of the device that can be raised in order to lift an object. In some examples, the device may be an autonomous fork truck with one or more forks (also referred to as "tines" or "prongs"), including a forklift or a pallet jack. In other examples, the device may be a different type of motorized device besides a truck, such as an AGV. Additionally, the device may only contain a single lift element (e.g., a single surface) that can be raised in order to lift an object. The object could be any moveable article or container. In some examples, the object may have a certain standardized shape and/or size, such as a pallet of boxes.

In one example, determining the target position of the device may include the device receiving instructions to pick up an object at the target position. Within examples, instructions to pick up an object include any type of digital signal or information that is receivable by the control system of the device. In some examples, the instructions may simply include a signal to pick up an object without other information identifying the object. In such examples, the control system of the device may infer which object to pick up or otherwise identify the object based on the current positioning of the device. The control system may also use predetermined guidelines regarding types of objects to be picked up. For instance, a pallet jack may have predetermined guidelines to only pick up and move pallets of boxes. In other examples, the instructions may include information to help the control system identify the object to be picked up as well. For instance, the instructions may include the type of object (e.g., a pallet of boxes), a location of the object, or other types of identifying information (e.g., shape, size, color, identification numbers, etc.). In further examples, the instructions may also information indicating how to pick up the object. For instance, the instructions may indicate a pickup point to place forks on the object and/or which side of the object to use to pick up the object.

In some examples, the target position of the device may be received from a remote operator computing device which sends a digital signal to the control system of the device. For instance, the remote operator computing device may include a graphical user interface with a selectable option (e.g., a button or menu item) to relinquish control of the device to the local automated system to complete pickup of an object. In some examples, the user interface may also enable communication of other types of information to include in the instructions, such as identification of the object (e.g., by clicking or selecting the object on a screen) and/or what point on the object to use as a pickup point.

In further examples, the target position of the device may instead be received from a remote automated system. For instance, the instructions could be received from a global control system of a robotic warehouse fleet, such as global control system 150 as described in reference to FIG. 1B. In such examples, the global control system may control the device to navigate close to an object (e.g., using a global map of the environment) to be picked up before transferring control to the control system for automated final device approach and object pickup.

At block 304, the method 300 includes operating a first steering motor, a second steering motor, and a traction motor of the device to cause the device to navigate to the target position, where the operating comprises: (i) rotating, by the first steering motor of the device, a first wheel of the device about a first steering axis such that the first wheel has a first rolling axis, (ii) rotating, by the first steering motor of the device, a second wheel of the device about a second steering axis such that the second wheel has a second rolling axis, (iii) rotating, by the second steering motor of the device, a third wheel about a third steering axis such that the third wheel has a third rolling axis, wherein the first rolling axis, the second rolling axis, and the third rolling axis intersect at an instantaneous center of rotation of the device, and (iv) rotating, by the traction motor of the device, the third wheel about the third rolling axis such that the third wheel propels the device along a surface to the target position.

Figure 4:
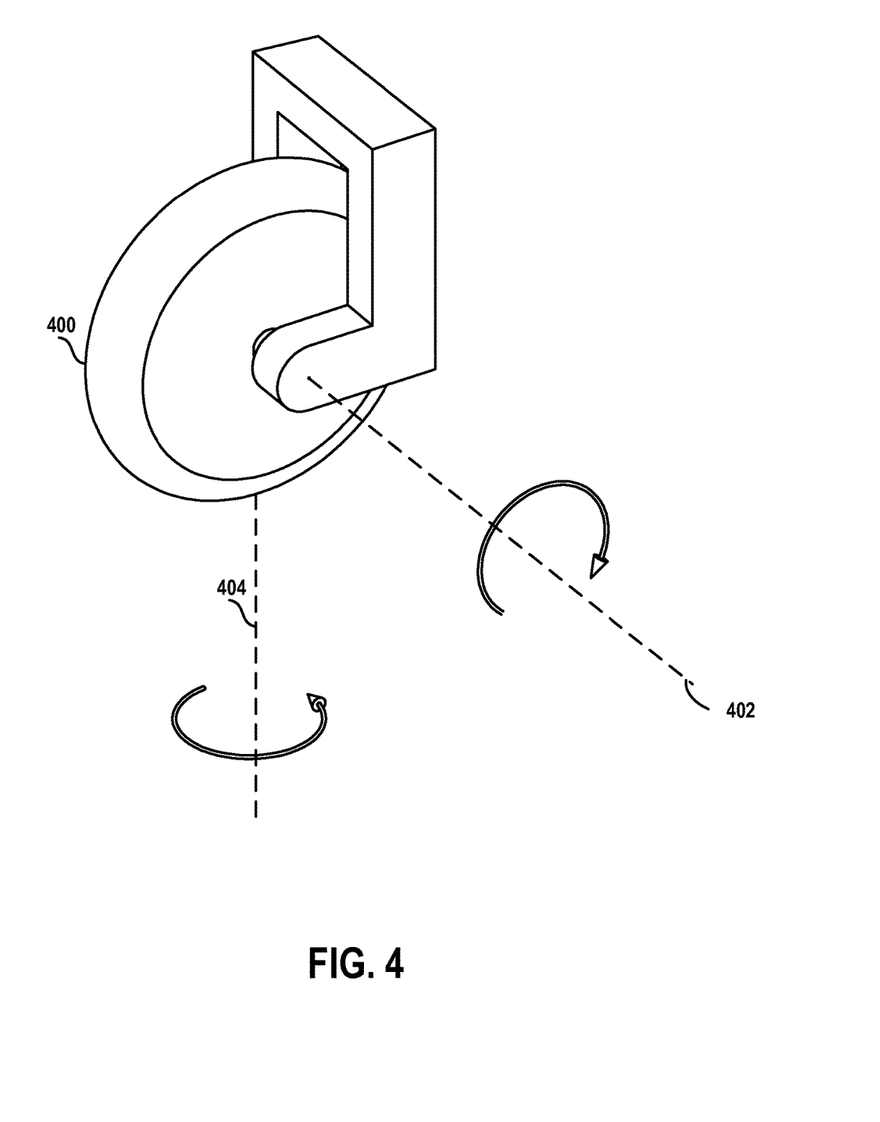
FIG. 4 illustrates a wheel, according to an example embodiment.

FIG. 4 illustrates a wheel 400, according to an example embodiment. Referring to block 304 of the method 300, the wheel 400 may be any of the first wheel, the second wheel, or the third wheel. As shown in FIG. 4, the wheel 400 may rotate about a rolling axis 402 to move the wheel 400 forward/backward. Further, for example, the wheel 400 may rotate about the steering axis 404 to adjust a steering angle and/or orientation of the wheel 400. In some examples, the wheel 400 may include additional components other than those shown in FIG. 4 similarly to components of the wheel module 220, 222 and/or 225 of FIG. 2. For example, the wheel 400 may include a traction motor, a steering motor, one or more rolling gears, one or more steering gears, one or more rolling encoders, and one or more steering encoders that are similar, respectively, to the traction motor 232, the steering motor 234, the rolling gear(s) 236, the steering gears 238, the rolling encoder(s) 242, and the steering encoder(s) 244 of the device 200.

Figure 5A:
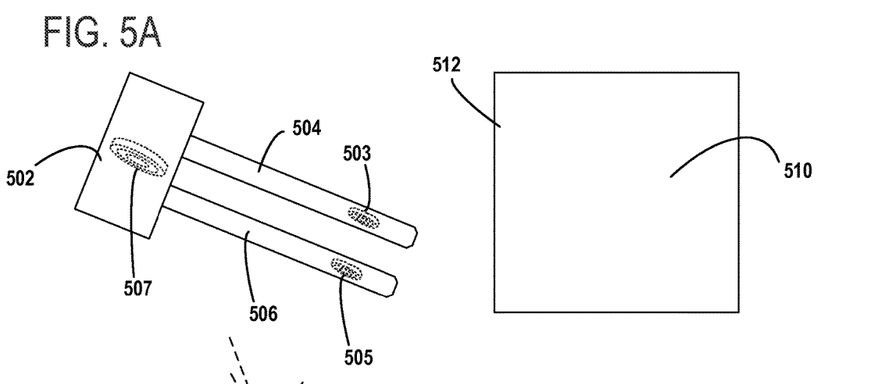
FIGS. 5A, 5B, and 5C illustrate an automated approach sequence for a pallet jack, according to an example embodiment.

FIG. 5A illustrates an initial positioning of a device, according to an example embodiment. With reference to block 302 of method 300, the control system of pallet jack 502 may determine a target position of the device. More specifically, the control system of the pallet jack 502 may identify the side 512 of the pallet 510 as the target position of the device. As is discussed in more detail below, the control system may then cause the pallet jack 502 to move toward the pallet 510 to fully insert the forks 504, 506 under the particular side 512 of the pallet 510 in order to pick up the pallet 510.

In one example, such steps may involve determining an approach path toward an object for the device to follow to place one or more of the device's lift elements under the object. In particular, the control system may determine a route for the device to follow towards the object in order to align and position the device's lift elements for pickup. In some examples, the approach path may be determined in order to place the lift elements at a center point of the particular side of the object (e.g., the middle of a side of a pallet). The center point may be determined based on sensor data from one or more optical sensors on the device that are oriented to detect the object.

Figure 5B:
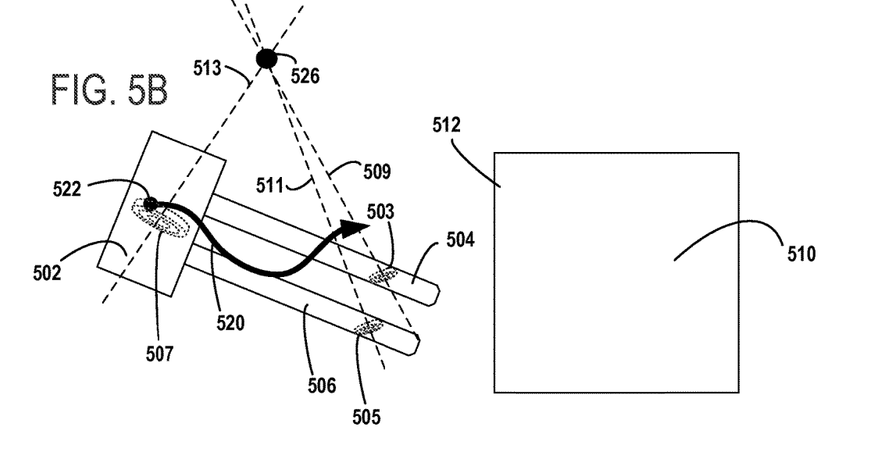

FIG. 5B illustrates an approach path toward an object, according to an example embodiment. More specifically, the control system of pallet jack 502 may determine approach path 520 for the pallet jack 502 to move along in order to place the forks 504, 506 of the pallet jack 502 under the pallet 510. The approach path 520 may start at a current positioning 522 of the pallet jack 502. Additionally, the approach path 520 may not have a predetermined endpoint because force feedback from one or more force sensors on the pallet jack 502 may be used to determine when to stop motion of the pallet jack 502 along the path 520. In some examples, the approach path 520 may be determined over time as pallet jack 502 moves along the path 520 and more sensor data (e.g., from one or more optical sensors) becomes available. Further, the control system of pallet jack 502 may determine a desired instantaneous center of rotation (ICoR) 526 that causes the pallet jack 502 to follow the approach path 520.

The approach path 520 may be determined in order to line up the pallet jack 502 with the pallet 510 so that the forks 504, 506 of the pallet jack 502 are perpendicular to the side 512 of the pallet 510 when inserted under the pallet 510. Determination of the path 520 may therefore take into account the current positioning and orientation of the pallet jack 502 as well as the current positioning and orientation of the forks 504, 506 in order to properly align the pallet jack 502 for pickup. In some examples, the path 520 may be determined to place the forks 504, 506 under a center point of the side 512 of the pallet 510. In other examples, the path 520 may be determined to place the forks 504, 506 at a different pickup point on the pallet 510 as well.

In particular, the control system may cause the pallet jack 502 to rotate a first wheel 503 via a steering motor of the pallet jack 502 such that the first wheel 503 has a first rolling axis 509. The control system may further rotate a second wheel 505 via the steering motor of the pallet jack 502 such that the second wheel 505 has a second rolling axis 511. Further, the control system may rotate a third wheel 507 via a traction motor of the pallet jack 502 such that the third wheel 507 has a third rolling axis 513. The first rolling axis 509, the second rolling axis 511, and the third rolling axis 513 may intersect at the ICoR 526 of the pallet jack 502. The control system of the pallet jack 502 may be configured to compute the desired ICoR or the desired change in ICoR to cause the pallet jack 502 to follow the approach path 520.

Referring back to FIG. 3, method 300 may further involve rotating, by the traction motor of the pallet jack 502, the third wheel 507 about the third rolling axis 513 such that the third wheel 507 propels the pallet jack 502 along a surface to the target position. In particular, using the example described above, this step may involve causing the pallet jack 502 to move along the determined approach path 520 toward the pallet 510.

Figure 5C:
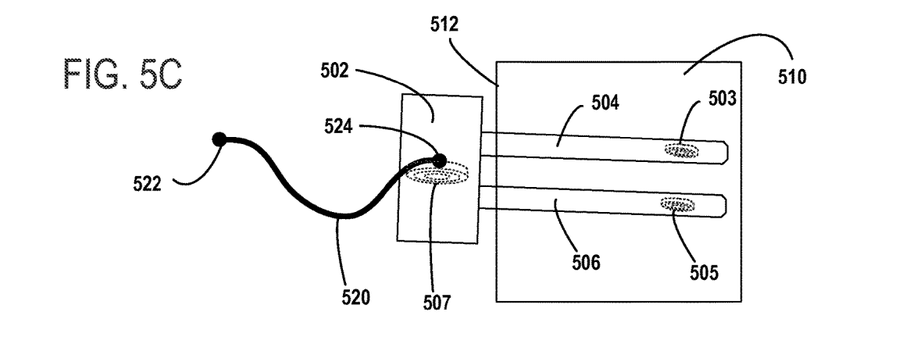

FIG. 5C shows a device at the end of an approach path, according to an example embodiment. More specifically, the pallet jack 502 may be controlled to move from starting position 522 along approach path 520 until it reaches point 524. When the pallet jack 502 reaches point 524, sensor data from one or more forces sensors on the pallet jack 502 may indicate that the forks 504, 506 are fully positioned under the pallet 510. For instance, one or more contact sensors on the body of the pallet jack 502 may detect contact with the pallet 510. As another example, one or more sensors on the wheels of the pallet jack 502 may detect that the pallet jack 502 is experiencing a resistive force when moving along the approach path 520. As previously discussed, the pallet jack 502 may be controlled to move slowly enough as it gets close to the pallet 510 to avoid damaging the pallet 510 or pallet jack 502 upon contact. When to slow down the pallet jack 502 and/or stop the pallet jack 502 may be determined at least in part using sensor data from one or more optical sensors on the pallet jack 502.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
   a frame including a body, a first fork extending from the body, and a second fork extending from the body;
   a first wheel coupled to the first fork of the frame;
   a second wheel coupled to the second fork of the frame;
   a third wheel coupled to the body of the frame;
   a first steering motor positioned in the body of the frame and coupled to each of the first wheel and the second wheel, wherein the first steering motor is configured to rotate the first wheel about a first steering axis and the second wheel about a second steering axis;
   a second steering motor coupled to the third wheel, wherein the second steering motor is configured to rotate the third wheel about a third steering axis;
   a traction motor coupled to the third wheel, wherein the traction motor is configured to rotate the third wheel about a rolling axis; and
   a controller configured to operate the first steering motor, the second steering motor, and the traction motor in order to cause the device to navigate within an environment.

2. The device of claim 1, further comprising:
   a plurality of encoders coupled to the first steering motor and the second steering motor to provide data indicative of an orientation of the first wheel and second wheel, wherein the controller is configured to cause the first wheel and second wheel to change the orientation of the first wheel and second wheel by causing the first steering motor to rotate the first wheel and second wheel, and wherein the controller is configured to identify the orientation of the first wheel and second wheel based on the data provided by the plurality of encoders.

3. The device of claim 2, wherein a given encoder of the plurality of encoders is configured to provide a signal indicative of the first steering motor being at a particular orientation, wherein the controller is configured to cause the first steering motor to rotate the first wheel and the second wheel until the given encoder provides the signal.

4. The device of claim 2, wherein the controller is configured to determine, based on the data from the plurality of encoders, at least one speed of the first steering motor responsive to the controller causing the first steering motor to rotate the first wheel and second wheel, and wherein the controller is configured to identify the orientation of the first wheel and second wheel based also on the at least one speed.

5. The device of claim 1, wherein the first steering motor rotates the first wheel and the second wheel about corresponding steering axes comprises a first steering motor coupled to the first wheel, and a third steering motor coupled to the second wheel.

6. The device of claim 5, wherein each of the first steering motor and the third steering motor comprises:
   an electric motor with a worm-drive gearbox configured to turn a slew bearing positioned around a given wheel.

7. The device of claim 5, wherein each of the first steering motor and the third steering motor comprises:
   an electric motor positioned in the body of the frame; and
   a chain-drive positioned in a given fork configured to turn a sprocket mounted on a slew bearing positioned around a given wheel.

8. The device of claim 5, wherein each of the first steering motor and the third steering motor comprises:
   a direct drive motor driving a moving portion of a slew bearing positioned around a given wheel.

9. The device of claim 1, wherein the first steering motor rotates the first wheel and the second wheel about corresponding steering axes comprises a single steering motor operable to steer both the first wheel and the second wheel.

10. A method comprising:
    determining, by a control system of a device, a target position of the device;
    operating a first steering motor, a second steering motor, and a traction motor of the device to cause the device to navigate to the target position, wherein the operating comprises:
      rotating, by the first steering motor of the device, a first wheel of the device about a first steering axis such that the first wheel has a first rolling axis, wherein the first wheel is positioned in a first fork of a frame of the device, wherein the first steering motor is positioned in a body of the frame, and wherein the first steering motor is coupled to the first wheel;
      rotating, by the first steering motor of the device, a second wheel of the device about a second steering axis such that the second wheel has a second rolling axis, wherein the second wheel is positioned in a second fork of the frame, and wherein the first steering motor is coupled to the second wheel;
      rotating, by the second steering motor of the device, a third wheel about a third steering axis such that the third wheel has a third rolling axis, wherein the first rolling axis, the second rolling axis, and the third rolling axis intersect at an instantaneous center of rotation of the device, and wherein the third wheel is positioned in the body of the frame; and
      rotating, by the traction motor of the device, the third wheel about the third rolling axis such that the third wheel propels the device along a surface to the target position.

11. The method of claim 10, further comprising:
    receiving, by the device from two or more encoders coupled to the first and second steering motors, data indicative of orientation of the first and second steering motors, wherein operating the first and second steering motors and the traction motor to cause the device to navigate to the target position is based on the data received from the two or more encoders.

12. The method of claim 11, further comprising:
    receiving, by the device from a given encoder associated with the first steering motor, a signal indicative of the first steering motor being at a particular orientation, wherein rotating the first wheel and the second wheel by the device is based on causing the first steering motor to rotate the first wheel and the second wheel until the signal is received.

13. The method of claim 11, further comprising:
    determining, based on the data from the two or more encoders, at least one speed of the first steering motor responsive to the device rotating the first wheel and the second wheel, wherein operating the first steering motor and the traction motor to cause the device to navigate to the target position is based also on the at least one speed.

14. The method of claim 11, wherein the two or more encoders include absolute encoders.

15. A non-transitory computer readable medium having stored therein instructions, that when executed by a device, cause the device to perform functions, the functions comprising:

determining a target position of the device; and in response to the determined target position of the device, operating a first steering motor, a second steering motor and a traction motor of the device to cause the device to navigate to the target position, wherein the operating comprises: (i) rotating, by the first steering motor of the device, a first wheel of the device about a first steering axis such that the first wheel has a first rolling axis, wherein the first wheel is positioned in a first fork of a frame of the device, wherein the first steering motor is positioned in a body of the frame, and wherein the first steering motor is coupled to the first wheel, (ii) rotating, by the first steering motor of the device, a second wheel of the device about a second steering axis such that the second wheel has a second rolling axis, wherein the second wheel is positioned in a second fork of the frame, and wherein the first steering motor is coupled to the second wheel, (iii) rotating, by the second steering motor of the device, a third wheel about a third steering axis such that the third wheel has a third rolling axis, wherein the first rolling axis, the second rolling axis, and the third rolling axis intersect at an instantaneous center of rotation of the device, and wherein the third wheel is positioned in the body of the frame, and (iv) rotating, by the traction motor of the device, the third wheel about the third rolling axis such that the third wheel propels the device along a surface to the target position.

16. The non-transitory computer readable medium of claim 15, the functions further comprising:

receiving, by the device from two or more encoders coupled to the first and second steering motors, data indicative of motion and orientation of the first and second steering motors, wherein operating the first and second steering motors and the traction motor to cause the device to navigate to the target position is based on the data received from the two or more encoders.

17. The non-transitory computer readable medium of claim 16, the functions further comprising:

receiving, by the device from a given encoder associated with the first steering motor, a signal indicative of the first steering motor being at a particular orientation, wherein rotating the first wheel and the second wheel by the device is based on causing the first steering motor to rotate the first wheel and the second wheel until the signal is received.

18. The non-transitory computer readable medium of claim 16, the functions further comprising:

determining, based on the data from the two or more encoders, at least one speed of the first steering motor responsive to the device rotating the first wheel and the second wheel, wherein operating the first steering motor and the traction motor to cause the device to navigate to the target position is based also on the at least one speed.

19. The non-transitory computer readable medium of claim 16, wherein the two or more encoders include absolute encoders.

* * * * *